INVENTOR
HAROLD D. REAGAN

United States Patent Office 3,484,079
Patented Dec. 16, 1969

3,484,079
FABRICATED PLUG FOR SPHERICAL PLUG VALVE
Harold D. Reagan, Houston, Tex., assignor to ACF Industries, Incorporated, New York, N.Y., a corporation of New Jersey
Filed July 11, 1967, Ser. No. 652,580
Int. Cl. F16k 5/06, 25/02
U.S. Cl. 251—309      9 Claims

ABSTRACT OF THE DISCLOSURE

A fabricated generally spherical plug for spherical plug valves which includes a pair of opposed hemispherical shells joined to define a spherical plug configuration and having a tubular conduit extending diametrically through the spherical plug to form a flow passage. At least one structural bridge member is disposed within the spherical plug and is connected by welding both to the tubular conduit and to the hemispherical shells to strengthen the plug against collapse by external pressure and to transmit torque forces to the tubular conduit.

BACKGROUND AND DESCRIPTION OF THE INVENTION

This invention relates generally to valves and more specifically to spherical plug valves particularly of the larger variety which are employed for controlling the flow of fluid in pipelines and other large flow systems. The invention, however, is not intended as being limited to incorporation only in large valve structures. It will appear obvious from an understanding of the disclosure that my invention is applicable in spherical plug valves of virtually all sizes.

Fabricated lightweight spherical plug members, which are generally referred to in the valve industry as balls for ball valves, are considered desirable for a number of reasons. Fabricated ball structures, because they are light in weight as compared to solid metal balls, generally require less torque to induce rotation of the ball between open and closed positions. This low torque aspect is important not only from cost considerations, but also has merit regarding the serviceability of ball valve and operator structures. The working parts of the valves tend to be more serviceable when the torque forces required to open and close the valve are low. The low weight characteristic of fabricated balls also eliminates the requirement for excessively massive ball support and controls elements, such as bearings, operating stems, and the like, thereby further reducing the overall weight of fabricated valves as compared to valves having solid plugs and promoting the low cost aspects of valve manufacture without sacrificing serviceability. Valves having fabricated ball members are generally deemed to be lower in cost than valves having solid spherical plugs primarily because of the difference the volume of metal employed in the manufacture, and because fabricated structures can be manufactured from readily available materials with ordinary welding equipment. Fabricated plug structures also promote competitiveness of valves of this nature because plug support and control structures and operator requirements are generally lower in cost. Fabricated ball structures are also preferable because of lower cost machining requirements as compared with forged or cast valve structures. Fabricated ball structures can be formed quite accurately, thereby requiring only a light amount of machining or sealing surface preparation to produce a spherical sealing surface.

Fabricated plug structures have not been widely employed in the past in large valve structures primarily because of the problem of structural integrity. Plug structures which are fabricated from quite thin metal tend to collapse or deform excessively upon the application of external fluid pressures thereto, and therefore such plug structures are ordinarily limited to pressure ranges which are quite low. Moreover, the cost of producing fabricated plug structures from relatively thick materials which can support fluid pressure loads generally results in excessively high plug costs because of problems encountered in forming the semispherical shell members which compose the outer spherical surface of the ball when welded together.

A further aspect of fabricated valves which has hindered development is the difficulty of transmitting forces from the valve stem to the plug with developing forces sufficiently high in the area of the trunnions to yield the metal from which the valve is fabricated.

Accordingly, it is a primary object of the invention to provide a novel fabricated valve ball construction which employs lightweight fabrication material and yet has sufficient structural integrity to prevent collapse or excessive yielding thereof by external pressure.

It is a further object of this invention to provide a novel fabricated valve ball construction including structure which effectively transmits torque forces applied to the ball throughout the structural elements of the plug to eliminate metal yielding forces in confined areas of the ball structure.

An even further object of this invention contemplates the provision of a novel fabricated valve ball construction which is light in weight, low in cost and reliable in use.

Other and further objects of this invention will become obvious upon an understanding of the illustrative embodiments about to be described or will be indicated in the appended claims, and various advantages not referred to herein will occur to one skilled in the art upon employment of the invention in practice.

Preferred embodiments of the invention have been chosen for purposes of illustration and description and are shown in the accompanying drawings forming a part of this specification wherein.

Figure 1:
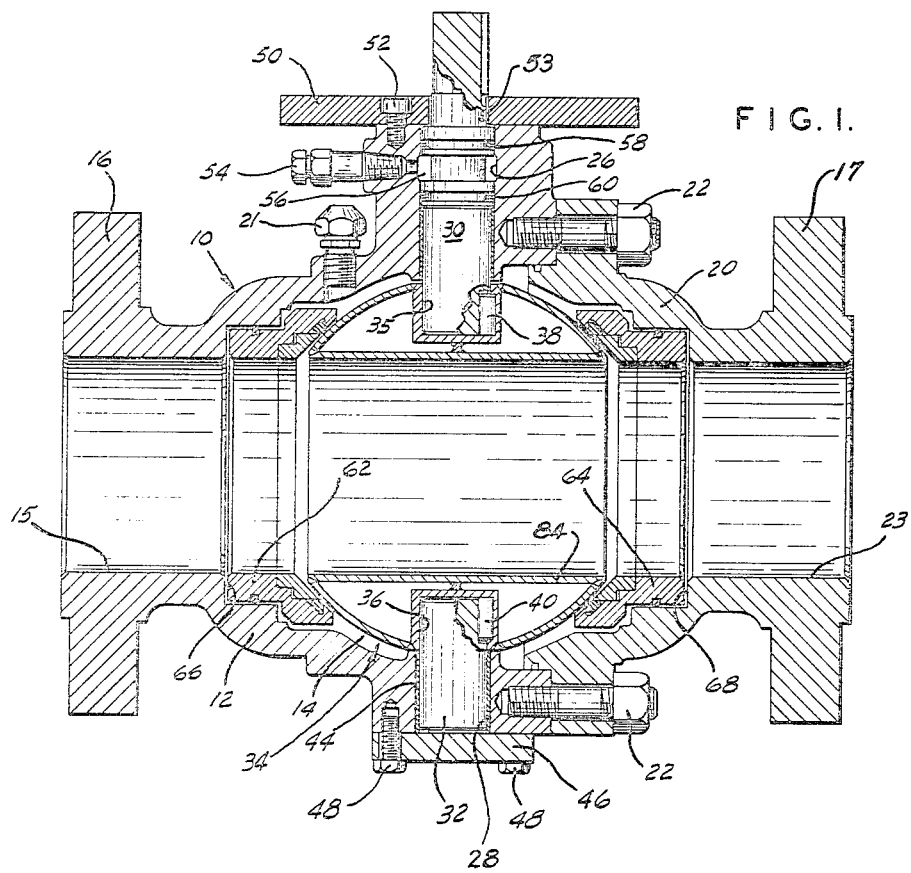
FIGURE 1 is an elevational view in section illustrating a spherical plug valve constructed in accordance with my invention.

Referring now to the drawings for a more complete understanding of the invention, a valve which may be an end entry spherical plug valve as illustrated at 10 in FIGURE 1 has a valve body portion 12 thereof defining a valve chamber 14. The valve body portion 12 of the valve 10 is formed with a flow passage 15 in fluid communication with the valve chamber 14. The valve body may be provided with a flange structure shown at 16 in FIGURE 1, or it may be provided with a weld end construction for either bolted or welded connection of the valve 10 to a pipeline or other conduit structure. Other conventional methods of connection between the valve 10 and a pipeline such as threaded connection, for example, may be employed without departing from the spirit or scope of this invention. An end closure portion 20 of the valve 10 is retained in sealed assembly with the valve body portion 12 by a series of bolts or threaded studs 22 and defines a closure for the valve chamber. The end closure member 20 is formed with a flow passage 23 which is disposed in axial alignment with the flow passage 15. The end closure member 20 may be provided with a flanged structure 17 for bolted connection thereof to a pipeline or other suitable connection structure may be employed within the spirit or scope of this invention. The valve body 12 may be provided with a pressure relief fitting 21 for bleeding body pressure to the atmosphere if desired.

The valve body 12 is formed with upper and lower aligned bores 26 and 28, respectively, which receive upper and lower trunnion members 30 and 32 respectively therein. A substantially spherical plug member illustrated generally at 34 forms an important part of this invention, and will be discussed in detail hereinbelow. The plug member 34 is provided with upper and lower trunnion apertures 35 and 36, respectively, which receive the upper and lower trunnions 30 and 32 to maintain alignment of the spherical plug within the valve body. Upper and lower key members 38 and 40 are retained within interrelated slot structures formed within the plug members and trunnion members to provide nonrotatable connection between the trunnion and the spherical plug. If desired, the key structure for the lower trunnion 32 may be eliminated and the ball 34 may be disposed in rotatable relation to the lower trunnion. It is required only that there be a nonrotatable connection between the operating trunnion or stem 30 and the ball 34 for purpose of valve operation. Bearing sleeve members 42 and 44 are interposed between the trunnion members and the respective cylindrical trunnion bores in the valve body. A cover plate 46 which provides a closure and support plate for the trunnion aperture 28 is fixed to the valve body 12 by a series of bolts 48. An operator adapter plate 50 is connected by a series of cap screws 52 to the upper extremity of the valve body about the upper trunnion bore 26. The upper trunnion or stem 30 extends through an aperture 53 formed in the adapter plate. Any one of a number of commercially available power or manually actuated valve operator devices may be fixed to the adapter plate 50 in any desirable manner to provide mechanical means for imparting rotation to the upper trunnion member 30, and thereby to impart rotation to the spherical plug member between the open and closed positions thereof.

For establishing a seal between the upper trunnion or stem 30 and the valve body 12, a stem packing adapter 54 is connected to the valve body 12 by threading or the like. The packing adapter is utilized to force semisolid packing material into an annular packing chamber 56 defined about the valve stem 30. A pair of sealing members 58 and 60 are disposed on opposite sides of the packing chamber 56 within annular grooves formed in the stem 30 and serve to prevent escape of the packing material from the packing chamber through the stem aperture 26.

To establish a seal between the rotatable spherical plug member 34 and the valve body, a pair of annular seat assemblies 62 and 64 are retained respectively within annular seat pockets 66 and 68 formed about the flow passages 15 and 23. The seat assemblies include a sealing portion thereof of any desired configuration or material which is disposed for sealing engagement with the spherical working surface of the ball member 34. Sealing engagement between the sealing portion of the seat assemblies and the spherical working is maintained during rotational movement of the ball except for those ball positions where the seal is broken by the flow passage through the valve.

Figure 2:
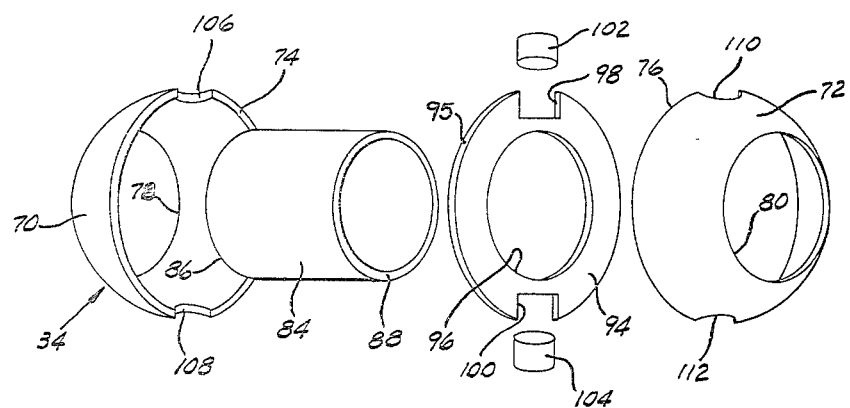
FIGURE 2 is an exploded view of the spherical plug or valve ball of the invention of FIGURE 1 illustrating the parts of spherical plug prior to assembly thereof.
Figure 3:
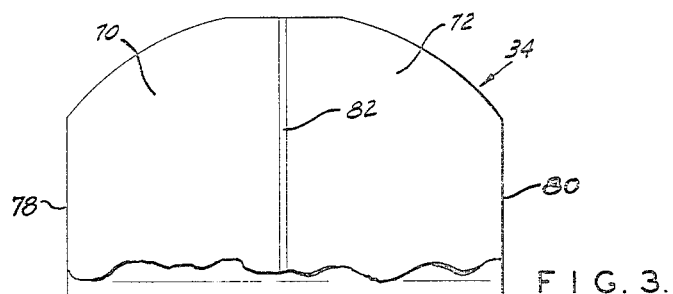
FIGURE 3 is an elevational view of the spherical plug of the invention of FIGURE 1 having a portion thereof broken away and illustrated in section.
Figure 3:
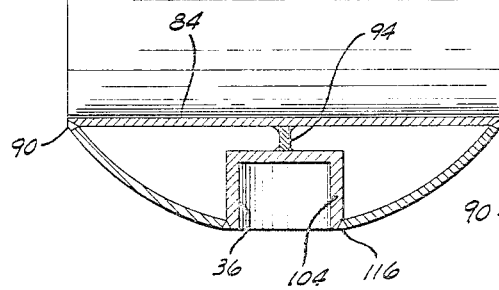

With reference now to FIGURE 2 which illustrates the component parts of the plug member 34 in detail, the plug member is shown to comprise a pair of generally hemispherical shells 70 and 72, each which defines generally circular circumferential edges 74 and 76 and is provided with generally circular conduit openings 78 and 80. When in assembly, the hemispherical shells 70 and 72 are joined by a circumferential weld 82, as illustrated in FIGURE 3, and define a generally spherical plug configuration. A tubular conduit 84 is disposed within the spherical plug 34, when assembled, and has its end edges 86 and 88 connected by substantially circular welds 90 and 92 to the hemispherical shells 70 and 72 at the openings 78 and 80 thereof. A generally circular reinforcing plate 94 having a circumferential surface 95 is provided with a generally circular opening 96 of a slightly larger dimension than the exterior dimension of the cylindrical tubular conduit 84. The reinforcing plate 94 is disposed about the tubular conduit 84 when in assembly and is connected to the tubular conduit by welding or the like intermediate the extremities thereof. The reinforcing plate 94 is provided with upper and lower generally rectangular notches or recesses 98 and 100 which are disposed in axial alignment. The recesses are formed by parallel side walls intersected by a transverse wall disposed normally thereto. A pair of trunnion support members 102 and 104 are disposed within the recesses 98 and 100 respectively and are welded about the recesses to the reinforcing plate 94. The trunnion support members 102 and 104 may be either cup-shaped having the cup opening directed outwardly or the trunnion support members may be provided in the form of solid cylindrical structures which are machined subsequent to fabrication of the ball 34 to define the trunnion openings 35 and 36. The hemispherical shells 70 and 72 are provided with axially aligned substantially semicircular recesses 106, 108, 110 and 112 which fit closely about the trunnion support members 102 and 104 when the hemispherical shells are placed in assembly. The trunnion support members 102 and 104 are connected to the hemispherical shells by circular welds 114 and 116 as illustrated in FIGURES 4, 5 and 6.

In assembling the spherical plug of this invention, the following assembly procedure has been found satisfactory. However, it is not intended that this procedure be limiting in regard to this invention because it is obvious that other assembly procedures may be employed within the spirit and scope of this invention. The reinforcing plate 94 is disposed about the tubular conduit 84 intermediate the extremities thereof and is welded on both sides to the tubular conduit. The trunnion support members 102 and 104 are then disposed within the recesses 98 and 100 and are welded to the reinforcing plate on all sides thereof which contact the reinforcing plate. The tubular conduit is then placed in assembly with one of the hemispherical shell members 70 or 72 locating the semicircular recesses 106 and 108 of the shell in juxtaposed relation with the respective trunnion support structures 102 and 104. The weld 90 or 92 is then formed thereby integrally connecting the tubular conduit and the hemispherical shell. The other hemispherical shell is then placed in assembly with the tubular conduit in such manner that the semicircular recesses 110 or 112 are juxtaposed with relation to the trunnion support members 102 and 104, and is welded to the tubular conduit at 90 or 92. The hemispherical shells are then interconnected by means of the circumferential weld 82 which in addition to interconnecting the abutting hemishperical shells also interconnects the circumferential surface 95 of the reinforcing plate 94 with the hemispherical shells. The circular welds 114 and 116 are then formed thereby integrally connecting the trunnion support members 102 and 104 to the hemispherical shells. Subsequent to formation of the spherically configured plug by welding, the trunnion bores 35 and 36 are machined to their proper size and surface configuration. The spherical surface of the plug is then subjected to light machining and surface preparation to produce a proper spherical working surface for the establishment of a fluid-tight seal between the ball and the seat members of the valve.

Figure 4:
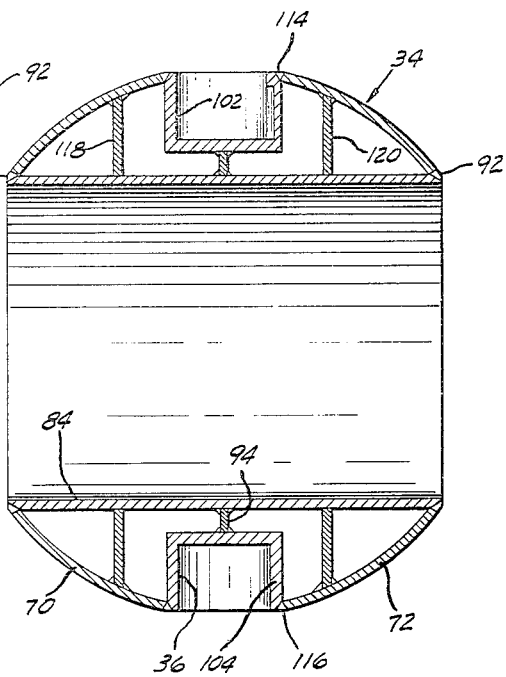
FIGURES 4 and 5 are elevational views in section illustrating modified embodiments of my invention.
Figure 5:
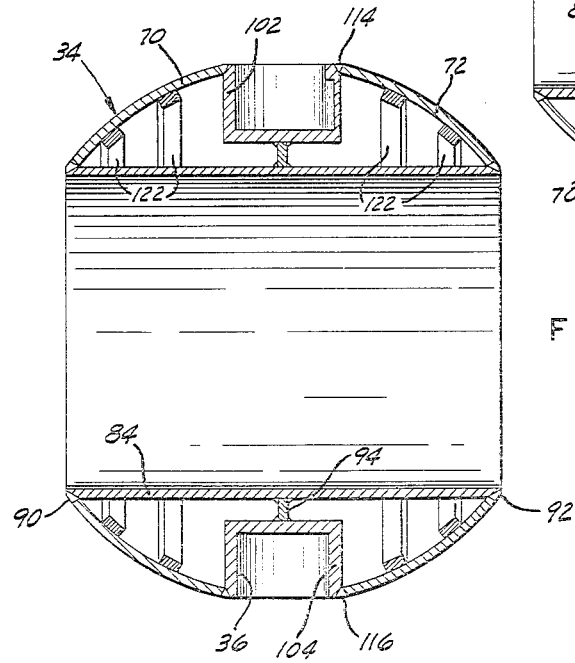

With reference now to FIGURE 4, when relatively high fluid pressures are to be encountered, the fabricated spherical plug 34 may be provided with supplementary reinforcing plates 118 and 120 which are welded or otherwise connected to the internal surface of the hemispherical shells 70 and 72 respectively. The reinforcing plates 118 and 120 may or may not be integrally connected by welds to the tubular conduit 84, depending upon the manner in which the plug is assembled. The supplementary reinforcing plates 118 and 120 will be disposed in force transmitting contact with the tubular conduit 84, thereby serving to provide support both for the exterior spherical surface and the internal tubular service of the plug. With respect to FIGURE 5, strengthening of the spherical surface of the plug may be accomplished by welding or otherwise connecting a series of hoop-like structures 122 to the internal spherical surface of the hemispherical shells 70 and 72. The hoop-like reinforcing members 122 prevent the spherical surface from collapse or undue distortion when the same is subjected to high fluid pressures.

OPERATION

With reference now to FIGURE 1 of the drawings, the fabricated spherical plug of this invention effectively presents a structure which is inherently resistant to the crushing or surface distorting effects of fluid forces applied to the spherical working surface of the valve by body pressure or by the pressurized fluid in the flow passages. Fluid forces impinging upon the spherical working surface will be transmitted through the reinforcing plate 94 shown in FIGURES 1–3 and through the supplementary reinforcing plates 118 and 120 in FIGURE 4 to the generally cylindrical conduit 84. The inherent resistance of the spherical shell surface of the ball is therefore supplemented not only by the inherent bridging strength of the reinforcing plate and supplemental reinforcing plates, but also by the structural integrity of the tubular conduit 84, thereby presenting a generally spherical working surface which is subject to extremely small surface deformation and which is effectively resistant to the crushing effect of externally applied fluid pressure from the body. This structure is also effective to prevent excessive plug deformation when fluid pressure forces are applied by line fluid in the open position of the valve as illustrated in FIGURE 1. Pressure forces acting on the interior of the tubular conduit 84 will be transmitted through the reinforcing plate 94 to the central portion of the spherical shell, thereby adding the structural support of the spherical shell and the reinforcing plate to the inherent stability of the substantially cylindrical configured tubular conduit 84. Fluid forces are also communicated directly from the tubular conduit to the spherical shell of the ball member 34 through the integral welded connection at each extremity of the tubular conduit. The fabricated construction of the spherical plug member of this invention is therefore provided with multi-structural support against fluid pressure forces even though the structure is simple in nature.

Torque forces which are induced to the trunnion support members of the valve ball 34 will be effectively transmitted both to the spherical shell structure and the tubular conduit structure of the ball in essentially the same manner as discussed above in regard to the even distribution of fluid pressure forces. Torque forces will be transmitted directly to the spherical shell by virtue of the welded connection between the spherical shell and the trunnion support structure and will be transmitted indirectly to the tubular conduit 84 through the reinforcing plate and the spherical shell structure. The torque forces applied to the trunnion support structures are therefore effectively distributed throughout the ball structure in such a manner as to preclude any tendency to develop excessively high forces in the trunnion supports which might tend to yield the structural materials and render the ball structure inoperative.

It is evident from the foregoing that I have provided a unique fabricated spherical plug construction which is light in weight as compared to solid plug structures and yet which has sufficient structural integrity to prevent collapse or excessive yielding of the materials thereof by external pressure. My invention also effectively accomplishes the indirect transmission of torque forces from the trunnion support portions of the plug member to the internal tubular conduit by means of the reinforcing plate in addition to achieving direct transmission of torque forces to the spherical surface portions of the plug. The fabricated plug of my invention therefore effectively resists any tendency of the plug to become deformed in the area of the trunnion support structures. The inexpensive nature of my invention is enhanced by the utilization of less plug metal as compared to valve plugs which are cast or forged. The competitive nature of valves incorporating my invention is further enhanced through the lightweight low-torque nature thereof which allows lower cost trunnion support structures and operator devices to be employed. Low cost machineability of valve balls constructed in accordance with my invention also enhances the competitive nature of valves incorporating such plug construction. It is therefore evident that my invention is one well adapted to attain all of the objects hereinabove set forth together with other advantages which will become obvious and inherent from a description of the apparatus itself.

I claim:

1. A fabricated generally spherical plug for spherical plug valves comprising a pair of generally identical hemispherical shell members fixed together to form a substantially spherical hollow plug configuration, each of said shell members having a generally circular opening therein, a tubular conduit disposed within said plug and being fixed at the extremities thereof to said hemispherical members about said generally circular openings, a generally circular, one-piece, reinforcing plate disposed within said plug and forming at least one sealed structural bridge between said tubular conduit and said hemispherical shells, said reinforcing plate being welded to said hemispherical members and to said tubular conduit and defining a pair of sealed chambers within said plug member, trunnion support structures fixed both to said hemispherical shells and to said reinforcing plate. whereby torque forces transmitted to said trunnion support structures will be transmitted through said reinforcing plate to the intermediate portion of said tubular conduit and will be transmitted directly to said shell members.

2. A fabricated generally spherical plug as set forth in claim 1, said plate having opposed notches formed therein, said trunnion support members being disposed one within each of said notches and being welded on at least one side thereof to said reinforcing plate.

3. A fabricated generally spherical plug as set forth in claim 2, said trunnion support members being generally cylindrical in configuration, said hemispherical shell members each being formed with aligned substantially semicircular recesses, said trunnion support members being welded to each of said shell members about said semicircular recesses.

4. A fabricated generally spherical plug for plug valves comprising a pair of substantially hemispherical shell members being welded together to form a hollow spherical plug configuration, each of said shell members having a generally circular opening formed therein, a substantially cylindrical conduit disposed within said plug and being welded at its extremities to said shell members about said openings, a plurality of generally circular, one-piece, reinforcing plates disposed within said plug member and being welded about the periphery thereof to said shell members, the centermost of said reinforcing plates being also welded to said cylindrical conduit thereby defining a pair of sealed chambers within said plug member, a pair of trunnion support members aligned in substantially normal relation to said conduit and being welded to said centermost reinforcing plate and to each of said hemispherical shell members, whereby torque forces induced to said trunnion support members will be transmitted indirectly through said structural bridge member to said conduit and will be transmitted directly to said hemispherical shell members, said structural bridge also serving to transmit fluid pressure forces acting on said hemispherical shell members to said tubular conduit intermediate the extremities thereof and to transmit fluid pressure forces acting on said tubular conduit to said hemispherical shell members.

5. A fabricated generally spherical plug as set forth in claim 4, said plate having opposed trunnion recesses, said trunnion support members being disposed within said recesses and being welded to said plate on at least one side thereof.

6. A fabricated generally spherical plug as set forth in claim 5, said hemispherical shells each having aligned generally semicircular recesses, said trunnion support members being of substantially cylindrical configuration and being welded to said shells about said semicircular recesses.

7. A spherical plug valve having a body portion defining a valve chamber, said body portion defining flow passages in fluid communication with said valve chamber, a generally spherical plug member rotatably disposed within said valve chamber, means for imparting rotation to said plug member, seat means disposed within said valve and being disposed in sealing engagement with said plug member and with said body portion, said plug member being formed by a pair of substantially identical hemispherical members having circumferential edges thereof in juxtaposed relation to define a hollow generally spherical shell, said hemispherical members defining aligned conduit openings, a substantially tubular conduit extending diametrically through said generally spherical shell and having the extremities thereof welded to said shell about said conduit openings, a plurality of generally circular reinforcing plates disposed within said shell about said conduit, the centermost of said reinforcing plate being welded to said conduit intermediate the extremities and about the periphery thereof, said centermost reinforcing plate being welded about its periphery to each of said hemispherical members, thereby defining a structural bridge transmitting fluid pressure forces from said generally spherical shell to said tubular conduit and transmitting fluid pressure forces acting on said tubular conduit to said generally spherical shell.

8. A generally spherical plug valve as set forth in claim 7, said hemispherical members and said centermost reinforcing plate being integrally joined by a single circumferential weld.

9. A spherical plug valve as set forth in claim 7, trunnion support members being welded to said centermost reinforcing plate and to each of said hemispherical members, whereby torque forces induced to said trunnion support members will be transmitted indirectly to said tubular conduit through said centermost reinforcing plate and directly from said trunnion support members to said hemispherical members for even force distribution.

References Cited

UNITED STATES PATENTS

| 3,047,265 | 7/1962 | Kaiser | 251—315 X |
| 3,246,873 | 4/1966 | Johnson | 251—315 X |
| 3,323,537 | 6/1967 | Shafer | 251—315 X |

FOREIGN PATENTS

| 406,660 | 2/1934 | Great Britain. |
| 687,567 | 5/1964 | Canada. |

M. CARY NELSON, Primary Examiner

M. O. STURM, Assistant Examiner